March 4, 1969　　　A. F. VAN VALER　　　3,431,428
SAFETY VEHICLE POWER DISTRIBUTION SYSTEM
Filed April 19, 1967　　　　　　　　　　　Sheet _1_ of 2

INVENTOR.
ANDREW F. VAN VALER,
BY
*Kimmel, Crowell & Weaver*
ATTORNEYS.

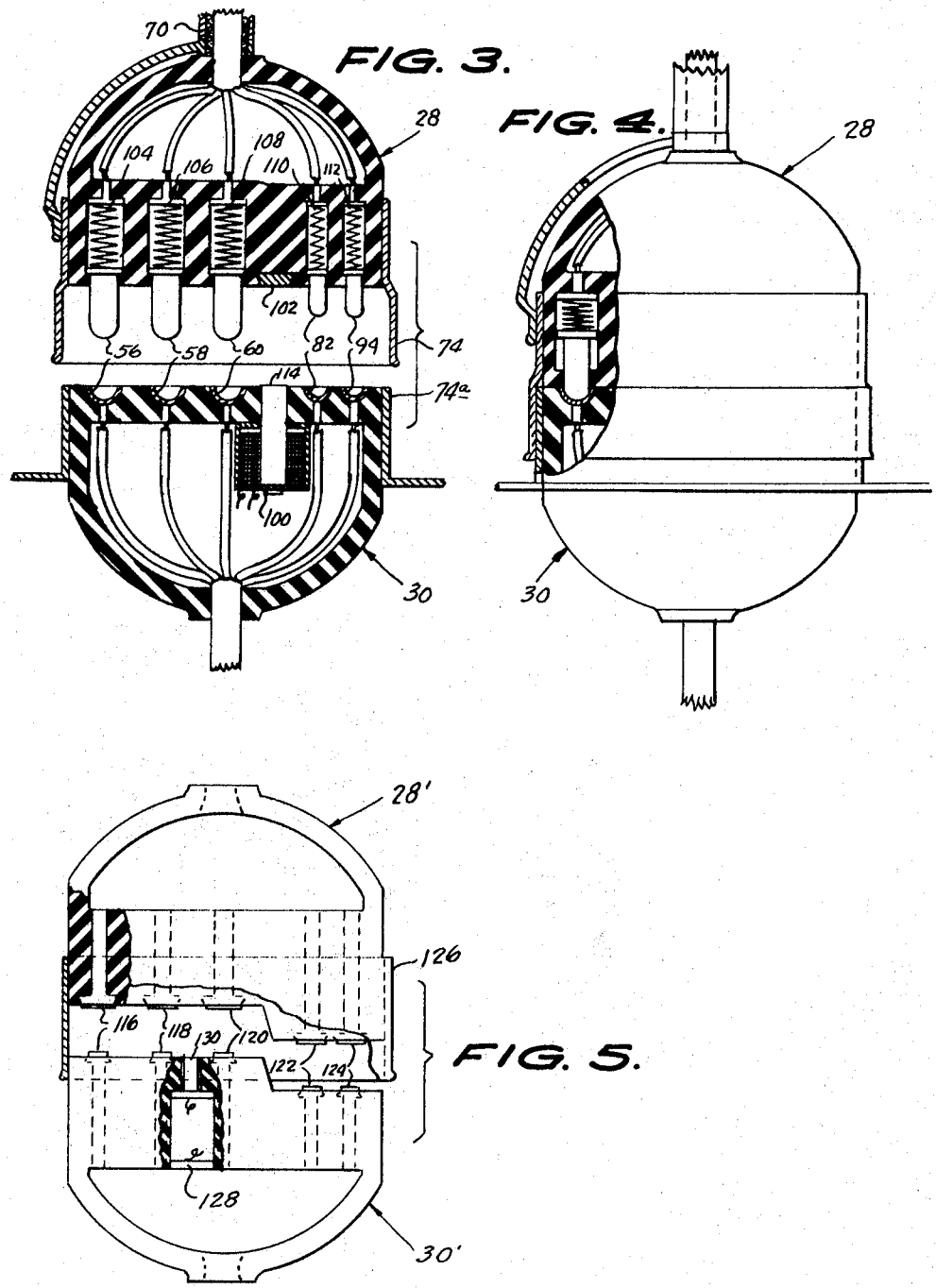

United States Patent Office 3,431,428
Patented Mar. 4, 1969

3,431,428
SAFETY VEHICLE POWER DISTRIBUTION SYSTEM
Andrew F. Van Valer, P.O. Box 87,
Grass Valley, Calif. 95945
Filed Apr. 19, 1967, Ser. No. 631,970
U.S. Cl. 307—10  9 Claims
Int. Cl. B60l 1/00; H01r 13/62

ABSTRACT OF THE DISCLOSURE

A power distribution system for furnishing power to vehicles from a fixed station including a switch at the fixed station and an electrically controllable release connector at the vehicle and an electrical circuit for physically disconnecting an electric cable from the vehicle and electrically disconnecting the cable from a source of power when the ignition of the vehicle is turned on is described.

BACKGROUND OF THE INVENTION

Field of the invention

This invention relates to power distribution systems in general and more particularly to safety systems for preventing damage to the electrical distribution system by a vehicle moving away from a fixed station while connected to said distribution system.

Description of the prior art

Quick release electrical connectors as such are well known in the prior art. For example, Patent No. 3,118,-713, issued to Ellis, discloses such a quick release electrical connector. Similar connectors are also disclosed in Patents Nos. 2,076,136, issued to Weed, and 2,688,734, issued to Welling. The present invention is distinguished from these inventions in that it is directed to a system of electrical distribution which incorporates therein a controllably releasable electrical connector but is not directed particularly to the electrical connector; although, in the preferred embodiment, a highly desirable form of such a connector is incorporated. Connectors which are incorporated in distribution systems and which are broken by the movement of a vehicle are also known. Such systems and connectors are shown in 2,235,262, issued to Miller, and 2,748,359, issued to Swan. Such systems rely upon physical movement of the vehicle generally for the disconnect action; however, the present invention is related to a system which includes a disconnect connector but is distinguished from those of the prior art in that it is automatically disconnected when the vehicle ignition switch is actuated.

To appreciate the importance of the present invention, it must be placed in its proper context. With the increased use of frozen foods and the like, refrigeration trucks have become commonplace on the highwyas. While the trucks are being driven along the highway, the contents thereof are kept in the frozen condition at a desired temperature by a refrigeration unit on the vehicle usually built into the trailer. Oftentimes, however, it is necessary for the trailer or the truck to sit for long periods of time at a dock or warehouse waiting to be loaded or unloaded. Especially in winter, but at other times also, these docks are often wet either from precipitation or from melting of ice and collected frost. Accordingly, if it is desired to connect the refrigeration system to a source of electric energy at the dock or warehouse, a fixed station, considerable hazard is faced by the operator. In addition, truck drivers tend to worry about the condition of their trucks and their time schedules and to forget to disconnect an interconnection between a fixed power source and the vehicle which may be used to operate the refrigeration system during the long periods in which the vehicle stands idle. Accordingly, it is desirable to have a system for physically disconnecting the cable from the vehicle. This alone, however, is not sufficient for safety purposes since the cable may still be live, that is may have electric power connected to it, and it is possible for an operator to become severely shocked or electrocuted by handling the cable. While systems are known in the prior art which accomplish one or more of the functions of the present system and to some extent have similarly constructed components, the present system is distinguished from those of the prior art in that it electrically physically removes the interconnection between the power source and the vehicle and electrically deadens the cable.

Summary

The principal object of the present invention is to provide an electrical power interconnection and automatic disconnect system for providing power to a vehicle from a fixed source of electric energy and automatically physically and electrically disconnecting the power source from the fixed source of electric energy when the vehicle is started and more particularly when the vehicle ignition system is placed in operation.

The provision of a novel system including a highly novel disconnect connector also constitutes an important feature and object of the invention. The provision of an electrical power interconnection which includes an electrically actuated switch at a fixed station, a flexible cable connecting the fixed station with a vehicle, a quick electrical disconnect connector for connecting the cable to the vehicle, and circuit means for simultaneously physically disconnecting the cable from the vehicle and removing electric power from the cable constitutes an object of the present invention.

Other objects and features of the invention will become apparent from the specification which follows and from the drawings to which reference is made.

Brief description of the drawings

FIGURE 3 is a detailed view in cross section of a quick disconnect electrical connector which has been found to be particularly advantageous in the present system;

FIGURE 4 is a side view of the connector of FIGURE 3 shown in the connected position in partial cutaway to show the relative position of the parts therein; and FIGURE 5 is an alternative embodiment of the connector of FIGURE 3.

Description of the preferred embodiment

Figure 1:
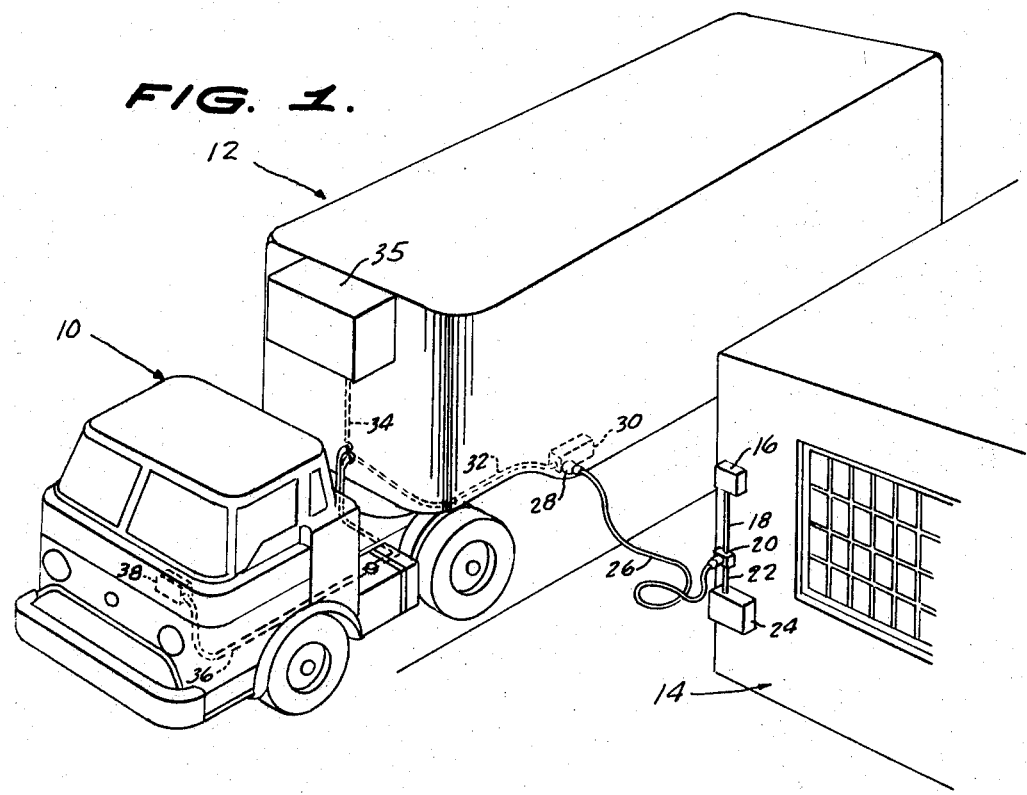
FIGURE 1 is an overall view of the system of this invention showing the relative positions of a fixed station and a vehicle and the interconnection therebetween.

Reference is made first to FIGURE 1 which shows the overall system as it would appear in use. While only one vehicle and distribution cable is shown, it will be realized that the system may be repeated as often as is necessary at a docking or warehousing facility.

In its preferred form, the system includes a vehicle which may comprise a tractor 10 and a trailer 12 of conventional type in which the trailer 12 is a refrigeration trailer used for hauling frozen or refrigerated goods. A fixed station 14 may include a connector system 16 for connection to a fixed supply of electric energy such as lines incoming from a power station. The supply source 16 is connected through a conduit system 18 to a cable connector 20 and a conductor 22 to a control box 24 which will be described in greater detail. A cable 26 interconnects the source of electric energy at 16 as controlled by the control system 24 with the vehicle through a connector member 28 on the end of the cable and a complementary connector member 30 in the vehicle which together comprise an electrical connector for the cable which, as will be described, constitutes a quick disconnect electrically controllable connector. Connector 30 is connected by means of conductors 32 and conductors 34 to the refrigeration unit 35 on trailer 12 and through conductors 36 to an auxiliary source of electric energy in the vehicle and to a switch in the vehicle, which is not shown in FIGURE 1, as will be described in greater detail with reference to FIGURE 2.

Figure 2:
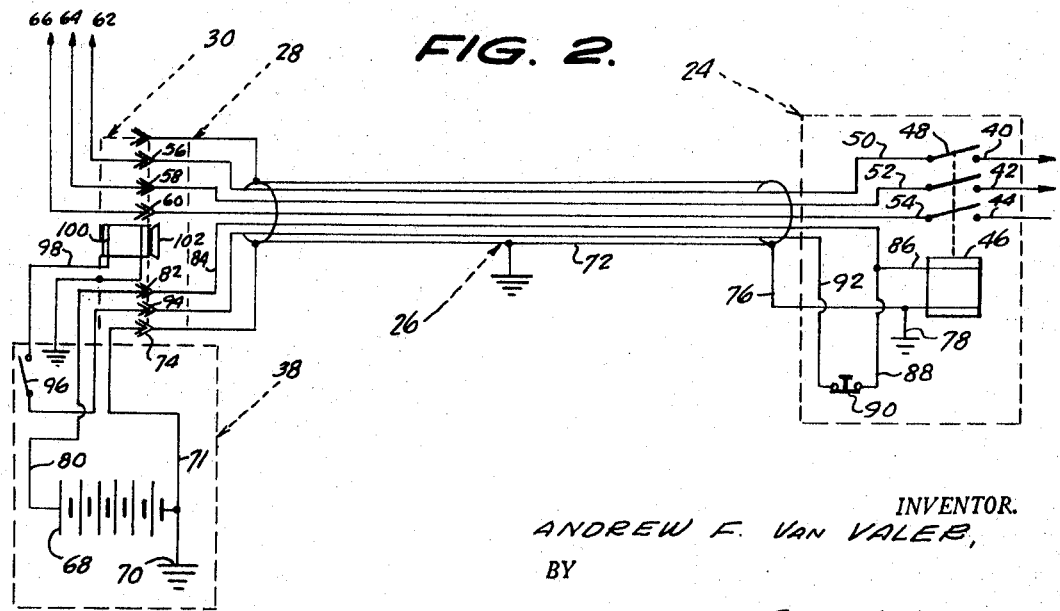
FIGURE 2 is an electrical schematic diagram of the system of this invention.

Reference is now made to FIGURE 2 which shows the electrical system in schematic.

As shown at 24, conductors 40, 42 and 44 leading from an electrical supply source at 16 may be connected through an electrically energized or actuatable system which may comprise a relay 46 having a plurality of contacts 48, 50, 52 and 54, and thence through cable 26 to contacts 56, 58 and 60 in connector 28 which comate with complementary contacts for connection to conductors 62, 64 and 66 which lead to the refrigeration unit at 35. It will be seen, then, that when contacts 48 are closed, a source of electricity from a fixed supply is provided to the refrigeration unit. As will be seen later, however, contacts 48 can be closed only when connector members 28 and 30 are together.

The auxiliary source of electric energy shown generally at 38 may comprise the vehicle battery 68 which is grounded at one side as shown at 70 and is connected by a conductor 71 to a grounded shield 72 on cable 26 through a contact 74 on the connector members 28 and 30. The grounded shield 72 is connected through a conductor 76 to a ground 78 and to relay 46. This ground system including the shield member 72 provides protection from shock to an operator by handling the cable even while it is electrically energized.

Another conductor 80 is connected at the other end of battery 68 and is connected through contact 82 and through connector 84 and connector 86 to relay 46. It will be apparent, then, that so long as the connector members 28 and 30 are together so that contact 74 and contact 82 are completed, voltage will be supplied from the auxiliary electric energy source 68 to relay 46 but that immediately upon the operation of connector members 28 ad 30, relay 46 will be deactuated or deenergized thereby permitting contacts 48 to return to the normal open position.

Voltage is also supplied from the auxiliary source of energy through conductor 80, contacts 82 and conductor 84 and through conductor 88 through a normally closed switch 90 and a conductor 92 and back through a contact 94 to switch 96 and from there through conductor 98 to an electromagnet 100 which cooperates with a magnetically permeable material 102 to retain connector member 28 in contact with connector member 30.

*Operation*

The operation of the system may now be described with reference to FIGURES 1 and 2. When the vehicle arrives at the fixed station, the cable 26 is connected by the connector 28 on the free end thereof to the vehicle by a means of connector member 30. This is done manually and the cable is dead until the connection is actually made. When the driver of the vehicle gets in the vehicle and turns on the ignition, this automatically opens switch 96 which is closed when the ignition switch is open and is open when the ignition switch is closed. This removes the energization from electromagnet 100. When this occurs, connector member 28 is physically released and physically separates from connector member 30 and consequently from the vehicle. When the connector 28 separates from the connector member 30, this breaks the contacts 74 and 82, as well as the power carrying contacts 56, 58 and 60, and thereby deenergizes relay 46 opening contacts 48. This removes all electrical power from the cable.

Alternatively, if it is desired to disconnect the vehicle from the fixed source of electric energy, this can be done at the fixed source merely by opening switch 90 momentarily. This has the same effect as opening switch 96, releasing connector member 28 from connector member 30 thereby deenergizing relay 46.

The operation of the disconnect connector system including connector members 28 and 30 is best understood with reference now to FIGURE 3. While other forms of the disconnect connector may be used, the form shown in FIGURE 3 has been found particularly desirable. As shown, the contacts 56, 58, 60, 82 and 94 are movable relative to the connector member 28 and are biased outwardly by a plurality of compression springs 104, 106, 108, 110 and 112. It will be seen, therefore, that when connector member 28 is pressed into contact with connector member 30, the resilient bias exerted by the compression springs will separate the two connector members as the result of the bias force exerted on the contacts. However, if electromagnet 100 is energized thereby producing a magnetic field in coil 114, coil 114 will attract the magnetically permeable member 102 and, when connector member 28 is pressed into the contact with connector member 30, the magnetic attractive force of electromagnet 100 in cooperation with magnetically permeable member 102 will be sufficient to overcome the bias exerted by compression springs 104, 106, 108, 110 and 112. Of course, the embodiment as shown in FIGURES 3 and 4 is merely exemplary and the same concept of construction may be used by varying the physical placement and arrangement of the contacts and magnets. For example, the geometric arrangement of the magnets and the contacts may be varied to suit the particular requirements under consideration.

In an alternative embodiment, as shown in FIGURE 5, a plurality of contact sets 116, 118, 120, 122, and 124 may be provided which are not resiliently biased in the manner as shown in FIGURE 3. In this embodiment, a resilient clip member 126 is provided to hold the two members of the connector together. A solenoid 128 having a reciprocable armature 130 is provided which, upon actuation of solenoid 128, moves outwardly therefrom forcing member 28' away from member 30'. The circuitry would be similar except that instead of maintaining the armature in actuated position, it would be maintained in deactuated position until it was desired to disconnect the vehicle from the fixed source of electric energy.

It will be seen from the foregoing description that the system provides an automatic disconnect system for physically and electrically disconnecting a cable from a vehicle. The increased safety of the system will be apparent from the description and the drawings.

It will be understood that while the invention has been abstracted, summarized, and disclosed with reference to a specific embodiment, specific components and specific circuitry, variations and deviations from the specific embodiment which is merely exemplary may be made by those skilled in the art from the foregoing description and the drawings without departing from the scope of the invention, as defined in the appended claims.

I claim:
1. An electrical power interconnection and automatic disconnect system for providing power from a fixed source of electric energy to a vehicle and automatically physically and electrically disconnecting said vehicle from said fixed energy source when said vehicle is started, which comprises in combination:
   an electrically actuated switch having normally open contacts in series with said fixed energy source;
   a generally flexible movable electric cable including conductors connected to said open contacts;
   an electrical connector including a member fixed to the vehicle and a removable member secured to the free end of the cable having contacts connected to said conductors, said fixed member including complementary contacts;

circuit means in the vehicle connected to said complementary contacts for interconnection to an electric energy consuming device in said vehicle;

disconnect means in the electrical connector, said disconnect means being electrically controllable to cause said removable member to physically separate from said fixed member;

a source of auxiliary electric energy in said vehicle; and circuit means interconnecting the auxiliary source, the electrically actuated switch and the disconnect means said circuit means including means for deactuating the electrically actuated switch and controlling the disconnect means to cause physical separation of the removable member from the electrical connector and to disconnect the fixed source of electric energy from said cable.

2. The system of claim 1 wherein the means for deactuating the electrically actuated switch and controlling the disconnect means comprises a switch in said vehicle for being opened when vehicle ignition switch in said vehicle is closed to permit operation of the vehicle.

3. The system of claim 2 further comprising:
a normally closed switch at a fixed station relative to the vehicle, said normally closed switch being electrically connected to permit control of said disconnect means and deactuation of said electrically actuated switch from said fixed station.

4. The system of claim 2 wherein the disconnect means comprises:
bias means in said connector operable to urge the removable member away from the fixed member; and
electromagnet means in said connector operable when energized to overcome the force of said bias means for permitting said bias means to cause physical separation of said members when the electromagnet means is deenergized.

5. The system of claim 4 wherein the bias means comprises:
a plurality of compression springs resiliently urging said contacts into physical contact, said contacts being movable relative to said members.

6. A power distribution system for supplying electric power to at least one vehicle while said vehicle is parked, comprising in combination:
a fixed station;
means at said fixed station for supplying electric energy;
electrical switch means at the fixed station, said switch means including means energizable by electric energy for closing a circuit to said electric energy supply only in the energized condition;

an electric cable having at least one conductor connected to said switch means for being connected to the energy supply when said switch means is energized;

an electrical connector member on the free end of the cable, said connector having at least one contact connected to said conductor;

a fixed complementary electrical connector member secured to said vehicle, said member having at least one contact for connection to said contact in said cable connector;

means in the fixed connector for controllably releasing cable connector, said means being electrically controllable; and means responsive to energization of an ignition system in said vehicle for controlling said means for releasing the cable connector and deenergizing said switch means to physically disconnect the cable from the vehicle and remove electric power from the cable.

7. The system of claim 6 further comprising:
a normally closed switch at the fixed station connected to permit control of the cable connector release means and the energizable switch means at the fixed station to selectively permit physical release of the cable connector from the vehicle and disconnecting of the cable conductors from the power supply.

8. The system of claim 7 wherein the means for releasing the cable connector comprises:
bias means secured in said connector for urging said connector members apart; and
an electromagnet in the connector for holding said connector members together when said electromagnet is energized.

9. The system of claim 8 wherein some contacts in the connector are relatively movable and the bias means comprises:
compression springs biasing the movable contacts against the complementary contacts to urge the connector members apart.

References Cited

UNITED STATES PATENTS

| 2,046,976 | 7/1936 | Sorensen | 307—10 |
| 2,076,136 | 4/1937 | Weed | 335—261 |
| 2,688,734 | 9/1954 | Welling | 339—45 |

ROBERT S. MACON, *Primary Examiner.*

D. SMITH, JR., *Assistant Examiner.*

U.S. Cl. X.R.

335—261; 339—45